April 14, 1959 G. E. HAUSEN 2,881,962
DISPENSING UNIT
Filed Oct. 8, 1957
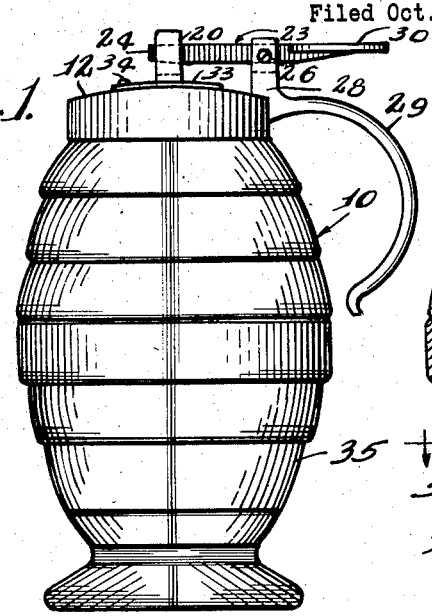
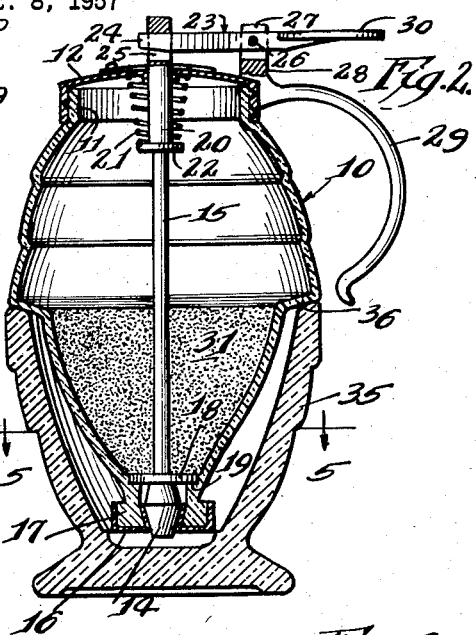
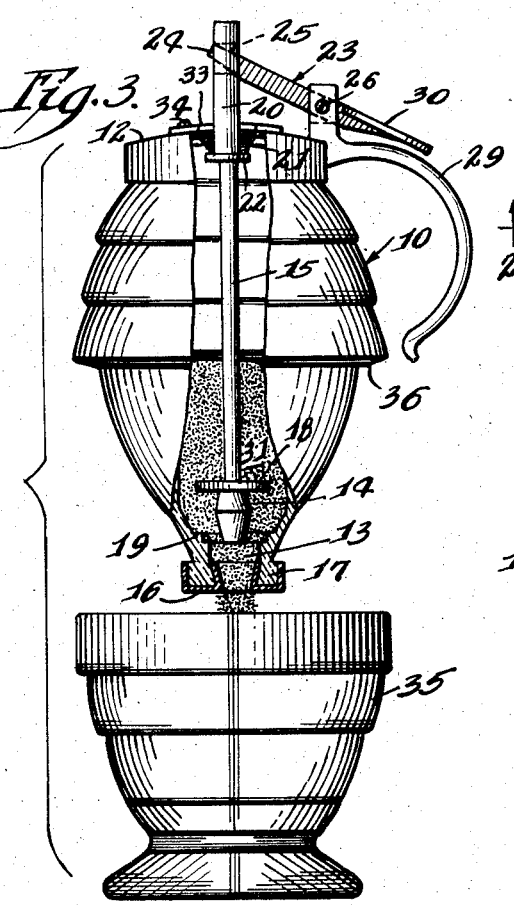
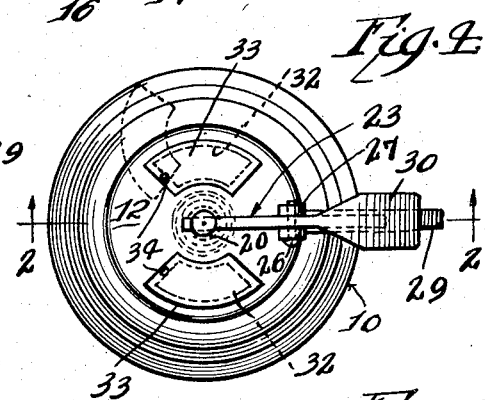
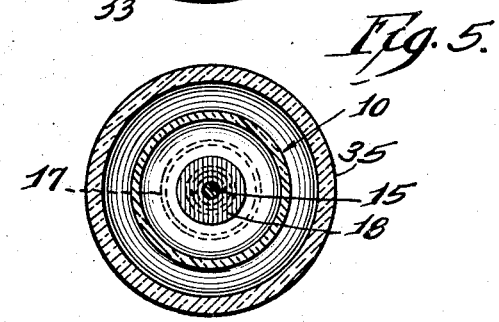
Inventor.
Gerard E. Hausen.
By Wilson T Jeffert
Attorneys.

United States Patent Office 2,881,962
Patented Apr. 14, 1959

2,881,962

DISPENSING UNIT

Gerard E. Hausen, Chicago, Ill.

Application October 8, 1957, Serial No. 688,905

2 Claims. (Cl. 222—473)

The present invention relates to a novel dispensing unit for dispensing sugar, syrup or other flowable contents from a receptacle or container.

It is an important object of the present invention to provide a novel dispensing unit comprising a receptacle for receiving and containing sugar, syrup or the like, and a novel control mechanism for dispensing therefrom an accurately measured quantity of the contents.

Another important object of the present invention is the provision of a novel dispensing unit including in combination a dispensing device having a receptacle provided with a discharge opening in the lower end thereof, means in said receptacle for effectively controlling the discharge opening and the flow therethrough, and a base for receiving and supporting the dispensing device in elevated position when not in use but maintaining it ready at all times for instant use.

The present invention further comprehends the provision of a novel dispensing unit adapted to replace the conventional forms of sugar or syrup dispensers where the contents are dispensed from the top. In the present novel assembly the container for the contents or substance to be dispensed is provided with a controlled opening in the bottom thereof, and a novel plunger and valve assembly for positively and accurately controlling the discharge of the contents through said opening.

Another object of the present invention is the provision of a novel means for and manner of controlling the flow or discharge of the contents of a container from the bottom thereof, including a novel thumb-actuated cut-off whereby the operator can readily, accurately and positively control the quantity of flow. With the discharge from the bottom and the container held upright at all times, discharge of syrup, sugar and the like is more effectively controlled and measured than with prior forms of dispensers.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in side elevation of a dispensing unit constructed in accordance with the present invention.

Fig. 2 is a view in vertical cross section thereof taken in a plane substantially on the line 2—2 of Fig. 4 and viewed in the direction of the arrows.

Fig. 3 is a disassembled view of the dispensing device elevated from the base or support, the receptacle of the dispensing device being broken away to disclose the plunger rod and the valve or closure elevated to dispensing position.

Fig. 4 is a plan view of the assembly of Fig. 1.

Fig. 5 is a view in horizontal cross section taken approximately on a plane represented by the line 5—5 of Fig. 2 and viewed in the direction of the arrows.

Referring to the disclosure in the drawing and more particularly to the novel illustrative embodiment therein shown, the dispensing device includes a receptacle or container 10 having a neck 11 at its upper end providing a relatively large inlet opening for the contents to be dispensed and adapted to be closed by a cover or closure 12 detachably threaded onto the neck. At its lower end the receptacle is provided with a reduced or stepped discharge opening 13 through which the contents are discharged by gravity.

To close and positively control the discharge opening 13, the present invention comprehends a closure plug or valve member 14 affixed to the lower end of a manually elevated plunger rod or valve stem 15, the closure or valve member 14 being tapered or of conical shape so as to be conformably received within the complementary surface of a metal collar 16 encompassing the lower reduced end 17 of the receptacle or container 10 and defining the discharge opening or port 13.

The closure plug or valve member 14 is also provided thereabove with a washer 18 affixed to the plunger rod or valve stem 15 and adapted to be conformably received upon an annular shoulder or offset 19 when the plunger rod or valve stem is lowered to close the discharge opening 13 and thereby prevent escape or discharge of the contents of the receptacle except when the plunger rod or valve stem 15 is raised from its lowered, closed position as shown in Fig. 2 to its partially or to its fully elevated, discharge position as shown in Fig. 3.

To actuate the plunger rod or valve stem 15, the upper enlarged end 20 thereof is projected upwardly through an aligned opening in the cover 12 with the rod or stem 15 spring-biased to its depending, lowered and closed position by a coil spring 21 held under compression between the underside of the cover 12 and a washer 22 affixed to the rod or stem 15 at the lower end of the enlargement 20. Thus the rod or stem 15 is spring-loaded and the latter and its closure 14 are automatically biased to their lowered or closed position (Fig. 2) by the spring 21.

To elevate the rod or stem 15 and thereby control movement of the closure or valve member 14 to partially or fully open position, there is provided a thumb-actuated lever arm 23 having one end 24 projected through a slot 25 in the upper end 20 of the valve stem 15, whereby movement accorded the lever arm 23 is transmitted to the rod or valve stem 15.

The lever arm 23 is detachably and pivotally mounted intermediate its ends upon a removable pivot pin or detachable screw 26 bridging the spaced bifurcations 27 of an upstanding stud 28 formed or cast integral with the cover 12 and a handle 29. The other or free end of the lever arm 23 is provided with a relatively wide, thumb-actuated projection or key 30 whereby depressing this key by the thumb actuates the lever arm 23 and raises the rod or valve stem 15 and its valve or closure 14 and permits the operator to positively and accurately control the effective size of the discharge opening 13 and the quantity of flow therethrough, and also to quickly cut off flow when the desired quantity has been dispensed.

As the valve stem or plunger 15 and its closure or control valve 14 are carried by the cover 12, removal of the cover would necessarily open the discharge port and permit escape of any contents remaining in the receptacle 10. To prevent this and to facilitate filling the receptacle 10 with the contents 31, the cover 12 is provided with one or more arcuate slots or inlet ports 32 each adapted to be opened or closed by a closure 33 pivotally mounted adjacent one end to the cover by a pin 34.

The receptacle 10 when not in use seats upon a hollow or cup-shaped base 35 that provides a support for maintaining the dispensing unit ready for immediate use and to catch any drip that may occur. To accommodate the receptacle and retain it upright in the base, the receptacle is provided with an annular shoulder or ledge 36 adapted to seat upon the upper or peripheral edge of the base in the manner shown in Figs. 2 and 3.

The receptacle 10 and the base 35 are preferably of glass or other transparency to permit the user to view the contents 31 and be apprised when the receptacle requires filling. The cover 12, valve stem or plunger 15, valve 14, washers 18 and 22, spring 21, lever arm 23 and handle 29, and the collar 16, are preferably of stainless steel, plated metal or the like that can be maintained sanitary, although any other material suitable for the purpose may be employed.

By supporting and enclosing the lower or discharge end of the receptacle in the base in the novel manner shown, there is no danger of contamination for files or other insects cannot obtain access thereto.

From the above description and the disclosure in the drawing, it will be apparent that the present invention provides for a novel dispensing unit for dispensing a desired quantity of sugar, syrup or other flowable mass that may be readily dispensed in measured quantities and particularly at the table or in the kitchen.

Having thus disclosed the invention, I claim:

1. A dispensing unit for dispensing sugar, syrup, and the like, capable of gravity flow, comprising a receptacle open at its opposite ends with the upper end provided with a fill opening and the lower end provided with a discharge opening and an annular ledge above said opening, a valve stem in said receptacle having a valve member on the lower end and a washer thereabove for controlling flow through said discharge opening and a transverse slot adjacent to but spaced from the upper end of said valve stem, a cover through which the upper end of said stem projects, an abutment on said valve stem below and spaced from said cover, a coil spring encompassing the valve stem between said abutment and said cover for spring-loading said valve stem, washer and valve member to lowered closed position, and a lever arm pivotally mounted intermediate its length on said cover with one end projecting into the slot in the upper end of the stem and a thumb-actuated part on the other end of said lever arm adapted to elevate said stem, washer and valve member to control flow through the discharge opening, said thumb-actuated part when depressed elevating said spring-loaded stem, washer and valve member and when released said stem, washer and valve member are automatically moved to closed position.

2. A dispensing unit for table use in the dispensing of sugar, syrup, and the like, consisting of a transparent container having a relatively large fill opening in the top and a tapered discharge opening in the bottom with the lower portion of said container decreasing in cross section toward said discharge opening and provided with an annular ledge above and encompassing said discharge opening, a plunger vertically movable in said container and provided at its lower end with a closure including a tapered plug conformably received in said discharge opening and a washer seating upon said annular ledge in said container, a transverse slot in but spaced from the upper end of said plunger, a removable cover for the fill opening and provided with a central opening through which projects the upper end of said plunger and one or more arcuate slots for filling the container without removing the cover and each provided with a pivoted closure, means including an abutment and a coil spring encompassing the plunger immediately below said cover with one end bearing against the cover and the other end against the abutment for spring-biasing said plunger, washer and closure to lowered position for closing said discharge opening, a handle and a pivoted lever arm on said cover with said lever arm having one end received in the slot in the upper end of said plunger where it projects above said cover, and a thumb-actuated part at its other end for elevating said plunger and closure when depressed to dispense the contents of said container.

References Cited in the file of this patent

UNITED STATES PATENTS

| | | |
|---|---|---|
| 1,449,571 | Younger | Mar. 27, 1923 |
| 2,169,779 | Loewe | Aug. 15, 1939 |
| 2,284,720 | Binon | June 2, 1942 |
| 2,636,646 | Olsen | Apr. 28, 1953 |